United States Patent [19]
Aubele

[11] Patent Number: 4,785,545
[45] Date of Patent: Nov. 22, 1988

[54] MEANS FOR SIMULTANEOUSLY CONNECTING A PLURALITY OF SWITCH-TYPE PROBE HEADS TO THE MEASUREMENT ARM OF A COORDINATE-MEASURING MACHINE

[75] Inventor: Karl-Eugen Aubele, Gussenstadt, Fed. Rep. of Germany

[73] Assignee: Carl-Zeiss-Stiftung, Heidenheim/Brenz, Oberkochen, Fed. Rep. of Germany

[21] Appl. No.: 105,825

[22] Filed: Oct. 8, 1987

[30] Foreign Application Priority Data

Oct. 11, 1986 [DE] Fed. Rep. of Germany ....... 3634689

[51] Int. Cl.[4] .................................... G01B 7/00

[52] U.S. Cl. .................................... 33/557; 33/558; 33/561

[58] Field of Search ....................... 33/169 R, 556–561

[56] References Cited

U.S. PATENT DOCUMENTS

| | | | |
|---|---|---|---|
| 4,084,323 | 4/1978 | McMurtry | 33/561 |
| 4,608,763 | 9/1986 | Manns et al. | 33/558 |

FOREIGN PATENT DOCUMENTS

| | | |
|---|---|---|
| 2347633 | 9/1972 | Fed. Rep. of Germany . |
| 2725996 | 12/1977 | Fed. Rep. of Germany . |
| 2743665 | 4/1978 | Fed. Rep. of Germany . |
| 2712181 | 9/1978 | Fed. Rep. of Germany . |
| 2947394 | 5/1981 | Fed. Rep. of Germany . |

*Primary Examiner*—L. T. Hix
*Assistant Examiner*—David Porterfield
*Attorney, Agent, or Firm*—Hopgood, Calimafde, Kalil, Blaustein & Judlowe

[57] ABSTRACT

Plural switch-type probe heads used in a coordinate-measuring machine are electrically connected in parallel, and each probe head contains a resistor (106) which is series-connected to its switch contact (103/110). In addition, each probe head has a measurement resistor (108) which is independent of switch contacts, and the measurement resistors of all probe heads are also connected in parallel. The operative work-contacting switch signal is produced from a comparison of the currents flowing through the measurement resistors (108) and the series resistors (106).

10 Claims, 3 Drawing Sheets

MEANS FOR SIMULTANEOUSLY CONNECTING A PLURALITY OF SWITCH-TYPE PROBE HEADS TO THE MEASUREMENT ARM OF A COORDINATE-MEASURING MACHINE

BACKGROUND OF THE INVENTION

Switch-type probe heads, as used on coordinate-measuring machines, employ a three-point support to which a probe pin is pressed by spring force and which, with a high degree of precision, fixes the position in space of the probe pin and of its work-contacting probe ball. At the same time, this three-point support is developed as an electrical switch contact, in the manner of a normally closed switch which is actuated to open condition upon a lifting of the probe pin off any of its three points of support, in the course of a work-contacting process. Switch-type probe heads are illustratively described in German Federal Republic Patents 2,347,633, 2,712,181, 2,743,665 and in German Federal Republic OS No. 2,947,394.

It is also known that a plurality of switch-type probe heads can be mounted at the same time on the measurement arm of a coordinate-measuring machine. Thus, for example, the British commercial brochure, entitled "Three Dimensional Touch Trigger Probes MM for Measuring Machines" of Renishaw Electrical Ltd. (Ref. MM 981), describes a holder designated PH 5 which permits a simultaneous attachment of five probe heads in a star-shaped geometrical configuration. As shown in the schematic diagram of FIG. 1, the switch contacts of the plural probe pins (2*a, b, c*) in such a holder are connected in series to each other and to a common electronic unit (1). However, this kind of interconnection is disadvantageous, inasmuch as cable resistance and switch-contact resistance are cumulative, so that it is difficult to precisely establish the exact time of switching of a given probe head independently of the number of probe heads, particularly for situations involving a large number of probe heads. Furthermore, blind plugs (4*a* and 4*b*) which are not provided with probe heads must be provided for the connections in order to assure the operation of the arrangement.

The same commercial publication also describes a holder designated PH 7 which has two connections for probe heads, and these connections are in parallel. On this holder, however, only one probe head can be mounted, either to the one or to the other connection; otherwise, the switch contacts of plural probe heads short-circuit each other.

The above-discussed problem of cumulative contact and cable resistances can be circumvented if, as indicated in FIG. 2, the switch contacts (13*a, b, c*) of plural probe heads (12*a, b, c*) are fed separately to the electronic unit (11), and if all switch contacts are brought together via an OR-gate (14), in order to produce a common contact pulse. This solution, however, has the disadvantage that a very large number of connecting cables are then necessary, and it is not possible to employ connecting pieces and distributors in multiple branching of individual feed lines.

From Federal German Republic Patent 2,725,996, a probe head is known which has five individual switch-type probes, also in star-shape geometry. As can be noted from FIG. 9 of said patent, the switch contacts (71–75) of these five individual probes are connected to each other, in part in parallel and in part in series, by means of diodes (90/91), thus enabling automatic recognition of the individual probe which has effected a specific work-contacting procedure. In this arrangement, however, all five individual probes must always be connected simultaneously, and the attachment of further probes is not possible.

BRIEF STATEMENT OF THE INVENTION

It is the object of the present invention to create an arrangement for simultaneously connecting a plurality of switch-type probe heads to the measurement arm of a coordinate-measuring machine, such that a reliably reproducible contact signal will be supplied, regardless of the selected number of probe heads.

The invention achieves this object by providing, within the housing of each probe head (22; 102), a resistor (26; 106) in series with the associated switch contacts (23; 103/110), and by providing for the parallel connection (A) of all probe-head outputs.

By this measure, and as indicated in FIG. 3, a very large number of probe heads (22*a* to 22*g*) can be connected simultaneously to the measurement arm of a coordinate-measuring machine, in that the series resistors (26*a* to 26*g*) assure that the switch contacts (23*a* to 23*g*) do not short circuit each other. Furthermore, at each connection point for a probe head, an extension piece (24) can be applied with further distributors for additional probe heads (22*e* to 22*f*); whereby a tree structure is possible, with freely selectable geometry. The number or length of the cable connections therefore remains within a reasonable limit, since all probe heads (22*a* to 22*g*) are connected by a common connecting line (A) to the involved electronic unit (21). Blind plugs for unoccupied connection points are also unnecessary.

DETAILED DESCRIPTION

The invention will be illustratively described in detail, in conjunction with the accompanying drawings, in which.

Figure 3:
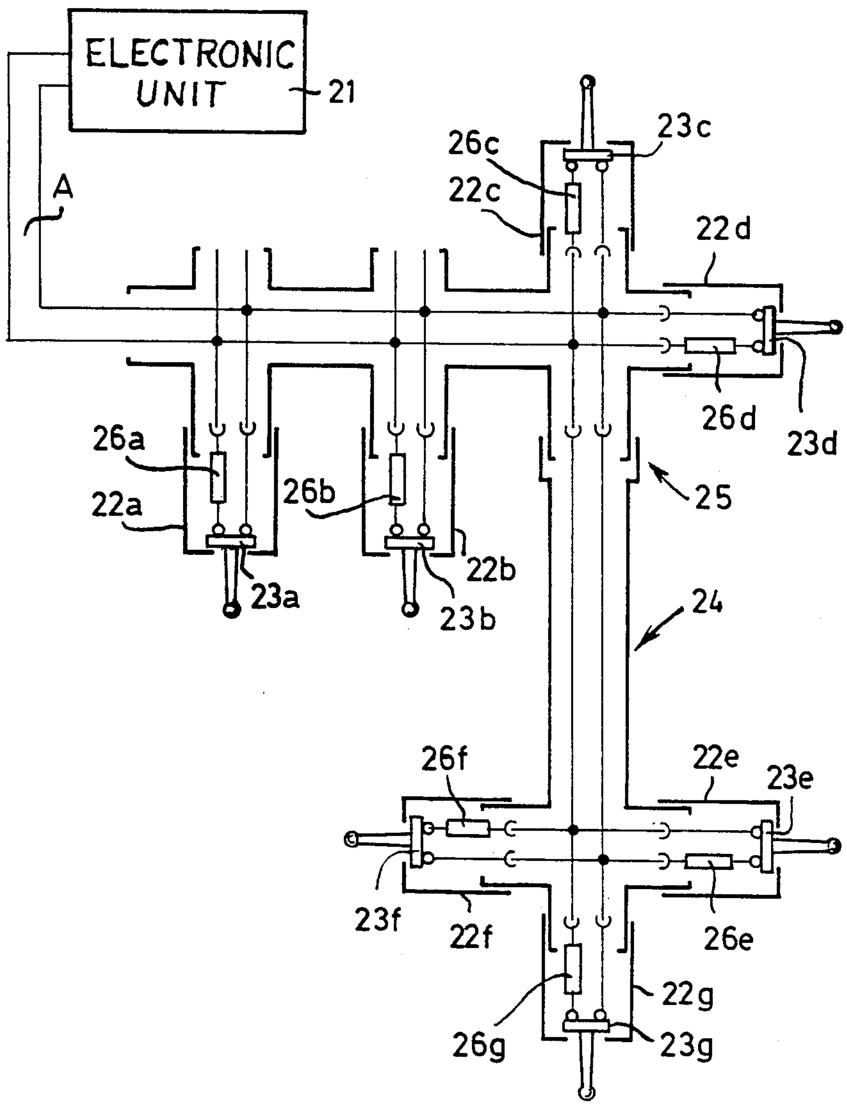
FIG. 3 is a schematic diagram which shows simultaneous interconnection of a plurality of switch-type probe heads in accordance the invention.
Figure 4:
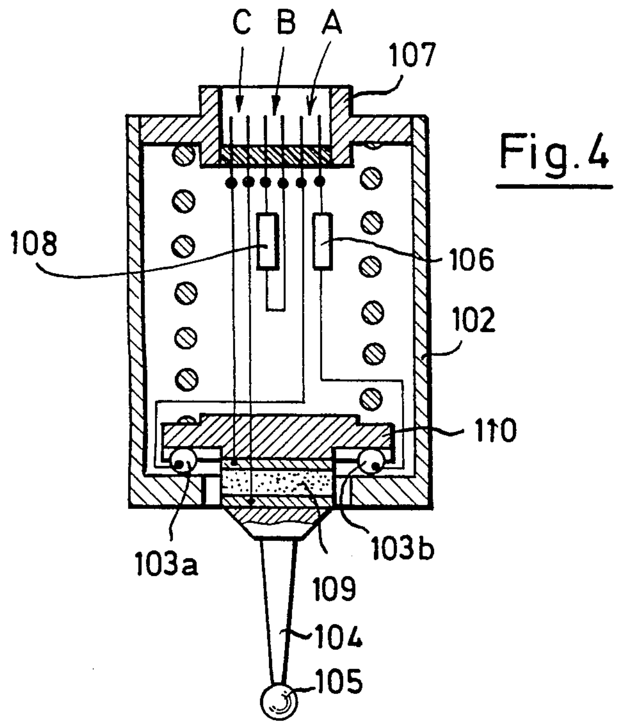
Figure 5:
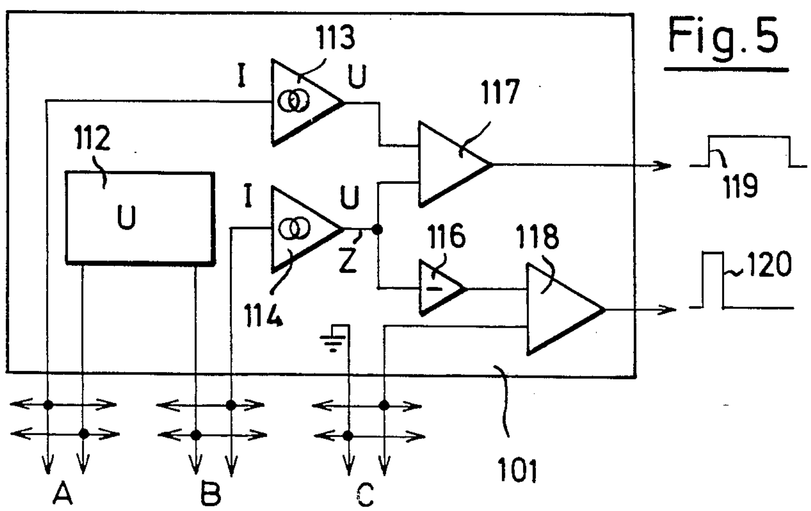

FIG. 4 simplified view in longitudinal section, to provide more detail for one of the plural interconnected probe heads of FIG. 3; and FIG. 5 is a diagram of an electronic unit suitable to multiple probe heads of the type shown in FIG. 4.

Figure 1:
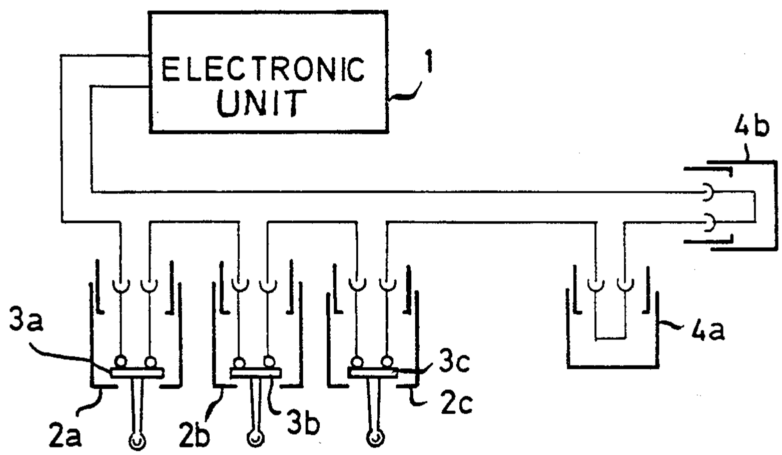
FIGS. 1 and 2 are schematic diagrams to illustrate prior-art techniques for electrical interconnection of plural switch-type probe heads.
Figure 2:
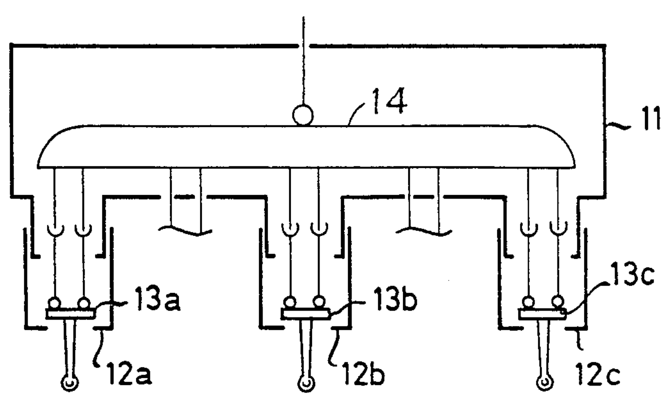

The diagrams of FIGS. 1 to 3 have already been explained in the introduction, in order to point out the differences between the previously known state of the art (FIGS. 1 and 2) and the present invention (FIG. 3).

FIG. 4 shows in greater detail one of the probe heads to be connected in parallel in accordance with FIG. 3. The probe head has a cylindrical housing 102, which on its lower side contains the bearing points, designated as balls 103*a* and 103*b*, for a probe pin 104 which is provided with a work-contacting probe-tip ball 105. The bearing balls 103 are developed as electric-switch contacts and, in the at-rest position of probe pin 104, are closed by pressure applied via base plate 110 of the probe pin 104. A resistor 106 is connected in series with the switch contacts 103 and is connected to the output A of a jack 107 arranged at the upper or mounting end of the probe head.

The probe head 102 additionally contains a measurement resistor 108 which is connected directly to the output B of the jack 107 and the function of which will be described below in conenction with FIG. 5. For the rest of the description, it is assumed that the resistors 106 and 108 have the same value, although this is not absolutely necessary.

The probe pin 104 is connected to the contact base 110 which is spring-urged to seating engagement with the bearing balls 103, and the pin-to-plate connection 104/110 involves an interposed piezoelectric sensor 109. The connections of the sensor 109 are attached to the third output C of the jack 107. With respect to the function of the sensor 109, reference is had to Federal Republic of Germany Patent 2,712,181. It serves to recognize the first instant of contact between a workpiece and probe ball 105 during the contacting process, namely, in the condition of very small contacting forces, when the switch contact 103*a,b* are still closed.

The measuring machine includes provision for selective mounting of multiple probe heads, but mechanical and structural detail of such mounting provision is not necessary to the present invention and is not shown. However, as shown in FIG. 3, a plurality of probe heads (of FIG. 4 variety) can be mounted simultaneously, with the respective outputs A, B, C, of all the probe heads connected in parallel. Each of the three parallel-connected circuits of the outputs A, B, C will be understood to be fed to one of separate A, B, C inputs of an electronic unit 101 the block diagram of which is shown in FIG. 5.

Electronic unit 101 contains a constant-voltage source 112 which is connected, on the one hand, to parallel-connected B terminals of the measurement resistors 108 in the connected probe heads. The other pole of the parallel-connected circuit B is connected to a current/voltage transformer 114. The voltage $U_{108}$ at the output of transformer 114 is proportional to the number of connected probe heads, independently of the condition of the switch contacts 103 in any of the probe heads.

The constant-voltage source 112 is, on the other hand, connected to the parallel-connected A terminals of several probe heads 102. Current flowing via the contacts 103 and the associated resistors 106 of all probe heads is converted in a second current/voltage transformer 113 into a voltage $U_{106}$, which is proportional to the number of probe heads (102) having closed switch contacts. The two voltages $U_{106}$ and $U_{108}$ are supplied to the inputs of a comparator 117. In the normal case, i.e., when the switch contacts 103 of all probe heads are closed, the voltages $U_{106}$ and $U_{108}$ are identical and the comparator 117 does not supply an output signal. But the voltage $U_{106}$ at the first input of the comparator 117 now drops somewhat because a switch contact in one of the connected probe heads has opened during the course of a contacting process; the comparator 117 becomes conductive and supplies a switch or trigger signal, designated 119 in FIG. 5.

It may be pointed out here that, in principle, it is also entirely possible to dispense with the separate measurement resistors 108 and to determine the trigger threshold in the course of a calibration process from the current flowing through the resistors 106 before the coordinate-measuring machine carries out a work-contacting procedure. The provision of the additional measurement resistor 108 is, however, advisable, since, in this way, the result is obtained that the number of connected probe heads is determined with very high reliability, and this setting is not disturbed by defectively open switch contacts in probe heads.

The outputs C of all probe heads 102, i.e., the terminals of piezoelectric sensors 109 of FIG. 4, are also connected in parallel, for all probe heads operated on the coordinate-measuring machine, and this parallel-connected C circuit is connected to the input of a second comparator 118 in the block diagram of FIG. 5. The second input of comparator 118 is connected to the output of an inverting amplifier 116, to the input of which there is also fed the output voltage $U_{108}$ of the current/voltage converter 114, it being recalled that voltage $U_{108}$ is proportional to the number of connected probe heads. By this measure, a sensitivity adjustment (dependent on the number of probe heads) is obtained for piezoelectric-detection signals supplied by sensor 109. This sensitivity adjustment is automaticlaly dependent on the number of probe heads and will be seen as a means of avoiding or compensating for time/displacement errors which would otherwise be attributable to pulse-profile changes by reason of resistance-loading variations as a function of the number of parallel-connected probe heads; stated in other words, the instant of work contact with any one probe pin is noted by a pulse 120, without positional error and to essentially the same fidelity, regardless of the number of probe heads in a given parallel-connected system of the invention.

It will be understood that diagrams supporting the above discussion have been simplified and are somewhat schematic. In FIG. 4, for example, the support balls 103*a* and *b* appear to be at diametrically opposite locations, whereas it should be understood that three support locations (120° apart) are relied upon for probe-pin seating in the at-rest position. Also, it should be understood that for each of these three support locations, each ball may have seating engagement to a pair of parallel cylinders, in which case the switch circuit of the probe head comprises the series-interconnection of the resistor 106 with all three contact-cylinder pairs, so that any ball dislodgement from seated position will cause the described switch-opening function of the involved probe head 102.

What is claimed is:

1. An arrangement for simultaneously connecting a plurality of switch-type probe heads (22; 102) to the measurement arm of a coordinate-measuring machine, characterized by the fact that each probe head (22; 102) contains within its housing a resistor (26; 106) in series relation with the switch contact (23; 103–110), and the outputs (A) of all probe heads are connected in parallel.

2. An arrangement according to claim 1, characterized by the fact that the parallel circuit connection (A) is connected to a source of constant voltage (112) as well as to a circuit (113, 117) which generates a contact signal (119) upon a change in the current impressed upon the parallel circuit (A).

3. An arrangement according to claim 2, characterized by the fact that the circuit contains a comparator (117) with adjustable threshold.

4. An arrangement according to claim 2, characterized by the fact that each probe head furthermore contains a measurement resistor (108) and that the measurement resistors of all probe heads (102) are connected in parallel and are also connected to a source of constant voltage (112) to thereby produce a signal ($U_{108}$) which is proportional to the number of probe heads.

5. An arrangement according to claim 4, characterized by the fact that the circuit contains a comparator (117) with adjustable threshold and by the fact that the output of the circuit (114) which supplies the signal ($U_{108}$) proportional to the number of probe heads also sets the comparator threshold.

6. An arrangement according to claim 1, characterized by the fact that each probe head furthermore contains a sensor (piezoelectric crystal 109) and the sensors of all probe heads (102) are connected in parallel.

7. An arrangement according to claims 4 and 6, characterized by the fact that the signal ($U_{108}$) which is proportional to the number of probe heads (102) is fed to control the sensitivity of the circuit (118) which processes the output signal of the sensor (109) which is furthermore provided in the probe heads (102).

8. An arrangement according to claim 1, characterized by the fact that a circuit is provided which measures the current flowing through the resistors switched in series to the switch contact (103/110) of all connected probe heads (102) and forms therefrom a signal characterizing the number of connected probe heads, which it stores.

9. An arrangement according to claim 8, characterized by the fact that the circuit compares the change in the current flowing over the resistors (106) which occurs upon an opening of the switch contacts (103/110) during a contacting process with said stored signal.

10. A connector device for connecting a plurality of switch-type probe heads to the measurement arm of a coordinate-measuring machine comprising:

a plurality of identical probe heads, each probe head containing a switch contact means and at least one resistor, both said switch contact means and said resistor being connected in a series circuit, a holder for mounting the plurality of probe heads to the measuring arm of the coordinate measuring machine, said holder having electric conductor means connecting said series circuits of all probe heads in parallel, an electronic arrangement connected to said conductor means and providing a signal indicative of the number of probe heads connected to said holder, and trigger means within said electronic arrangement and having a trigger threshold dependent on said signal.

* * * * *